Aug. 11, 1970 D. SILVERMAN 3,524,195
DECONVOLUTION OF VARIABLE OPTICAL DENSITY RECORDS
Filed Nov. 4, 1968 2 Sheets-Sheet 1

DANIEL SILVERMAN
INVENTOR.

BY Paul F Hawley

ATTORNEY

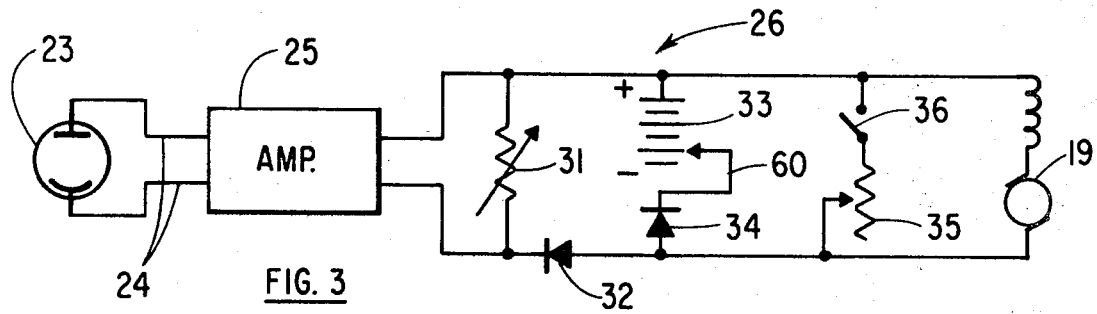
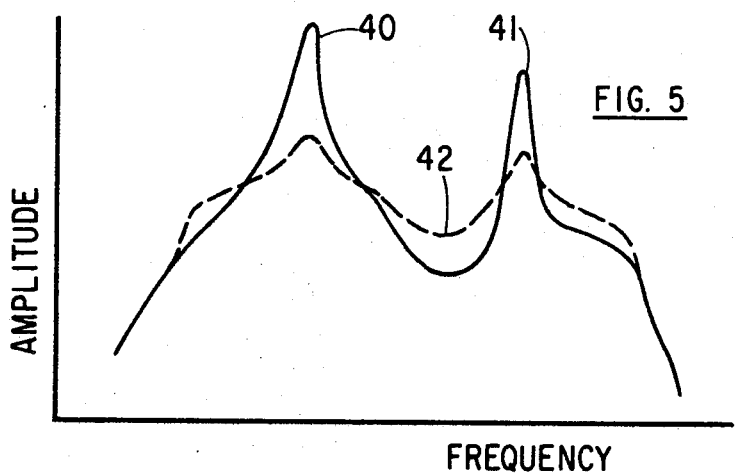
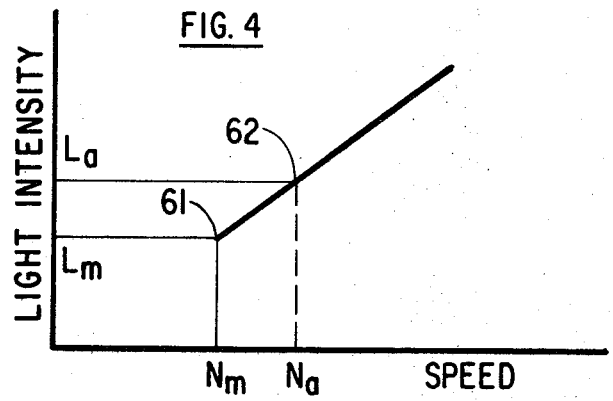
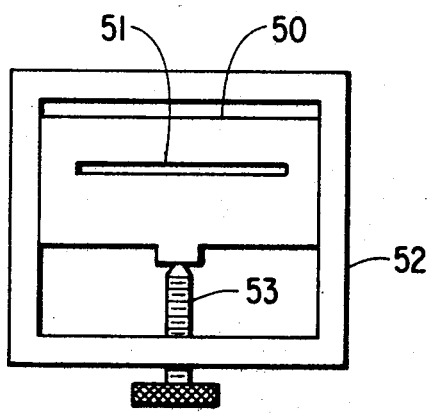

United States Patent Office 3,524,195
Patented Aug. 11, 1970

1

3,524,195
DECONVOLUTION OF VARIABLE
OPTICAL DENSITY RECORDS
Daniel Silverman, Tulsa, Okla., assignor to Pan American
Petroleum Corporation, Tulsa, Okla., a corporation of
Delaware
Filed Nov. 4, 1968, Ser. No. 773,218
Int. Cl. G01n 21/30
U.S. Cl. 250—219                                           11 Claims

ABSTRACT OF THE DISCLOSURE

A first strip of variable optical density comprising a multifrequency time function may contain frequency components, the amplitudes of which are excessive or deficient compared to that of other frequency components. A second variable optical density strip can be generated in which the range of amplitude with frequency has been decreased by forming a one-dimensional Fourier transform of the first strip in an optical processing device. Differences in amplitude with frequency on the first strip are represented on the transform by variation in intensity of illumination at distances corresponding to frequency along a line from the center of this plane. A mask with a narrow opening is moved at varying speed along the frequency axis of the transform plane. This speed is related to the light intensity passing through the narrow opening. Accordingly, the light passing through this opening ultimately generates the second record with more uniform amplitude-frequency relationship than was present on the first strip.

A plurality of record strips can be processed simultaneously. In this case, the newly formed strips are corrected in accordance with the average intensity-frequency relationship on all of the strips present.

CROSS-REFERENCE TO RELATED APPLICATION

A related patent application assigned to the assignee of this invention is U.S. Ser. No. 693,879 Farr et al., filed Dec. 27, 1967, entitled "Optical Deconvolution of Seismic Records," now Pat No. 3,418,626.

BACKGROUND OF THE INVENTION

This invention arose in the field of processing of seismic geophysical data by optical means, although it is not restricted to this application. It has been the practice for a number of years to present the results of seismic surveying, where seismic waves are generated at a plurality of points and received at a geographical different plurality of points, by forming record strips of variable optical density in which the variation from white to black or from transparency to complete opacity was in accordance with the amplitudes of the seismic waves received at groups of geophones. Successive traces or strips thus presented an array of geophysical data arranged in accordance with the location of the geophones on the earth's surface.

In each such record strip or trace, there was presented from one end to the other a variable density record of a multifrequency time function which was presented in terms of distance along the strip and therefore directly related to recording time in the original.

Many schemes for record processing have been worked out to alter the record strip used in the ultimate presentation to the geophysicists from that present when the original field record was taken. These include such matters as filtering to improve the signal-to-noise ratio, and the use of various optical processing techniques for eliminating from the record various bands epresenting seismic waves reflected from beds at certain specified depths. One type of interference or noise, which at times can be particularly annoying to the interpreter, present on such records in recurring phenomena unrelated to the geologic structure of the earth; for example, the results of reverberation effects due to seismic initiation of a wave which "bounces" or reverberates between top and bottom of an upper layer; for example, a very hard surface layer or a water layer such as a lake, an ocean or the like, sending down multiple pulses of seismic energy into the earth. This causes multiple seismic waves to be reflected from the subsurface strata and recorded on the field record. It is desirable to minimize the effect of these "multiples" and "reverberations." It is also desirable at times to emphasize somewhat various frequency components of complex waves sent back to the geophones to improve the character of the reflections. It is apparent that if each burst of seismic energy received were composed of a very narrow frequency band, the resultant record would show very little difference between the various reflections. Thus, the wider the frequency band present, the greater the possible difference between such bursts and the greater the possibility of the interpreter being able to separately identify such reflections.

The process of minimizing excessive response at certain frequencies while bringing up the relative amplitude of weak components is a process called deconvolution. One can say that if the entire Fourier spectrum (amplitude vs. frequency or power vs. frequency) was plotted for the original record strip or for any portion thereof, decreasing the relative amplitudes (which means lowering maxima and raising minima on this spectrum) involves deconvolution. It is apparent that such process cannot be carried to excess, because if all frequency components had about equal amplitude, it would result in a record essentially of a completely random nature in which individual events (e.g., reflections) would be undiscernible. Accordingly, while it is desirable to carry out deconvolution to reduce excessive energy in any particular frequency bands and perhaps increase that in others, the degree of deconvolution ordinarily must rest in the hands of the user of the resultant data.

Deconvolution can, of course, be carried out by reproducing the original record and digitizing it by passing it through an analog to digital converter. The resultant digital record of amplitude vs. time may then be handled in a computer by a program which determines the Fourier components in the spectrum, decreasing those of excessive relative amplitude and increasing those whose amplitude is considerably below the average, to whatever degree is considered desirable. The altered spectral record is then transformed back to a digital time function which is then converted by a digital to analog converter and presented in the ordinary optical form. However, this is a long and expensive process. Deconvolution can be carried out by optical means, which is a faster and less expensive process The general procedure of optical data processing and filtering has been described in several publications, such as the paper "Optical Data Processing and Filtering Systems," by L. J. Cutrona et al., in IRE Transactions on Information Theory, June 1960, pages 386–400. Specific applications of these techniques to filtering seismic waves have been described by P. L. Jackson in the paper "Analysis of Variable Density Seismograms by Means of Optical Diffraction," Geophysics, vol. XXX, No. 1, February 1965, pages 5 to 23, and by M. B. Dobrin et al., in the paper "Velocity and Frequency Filtering of Seismic Data Using Laser Light," Geophysics, vol. XXX, No. 6, December 1965, pages 1144–1178. In general, however, these prior-art data processing and filtering systems or procedures have been limited to the *complete* removal of certain frequency components by placing opaque masks, wires, and the like in the frequency transform plane. The results of these processes, while beneficial in many instances, differ from true deconvolution in that, by the elimination of certain frequencies or by selecting frequency bands or limits, they reduce or restrict the band width of the resulting signals; whereas, deconvolution only limits the amplitudes of the various frequency components, tending to equalize them without completely eliminating any, and in general, broadening the spectrum rather than narrowing it.

DESCRIPTION OF THE PRIOR ART

Two patents generally in the field of optical data processing, though neither deals specifically with the matter of optical deconvolution, are U.S. 3,305,834 Cooper et al. and U.S. 3,370,268 Dobrin et al. Also of interest are the following Canadian patents: No. 766,497 Ingalls, No. 781,170 Lohmann, and No. 785,504 Cook.

SUMMARY OF THE INVENTION

A variable optical density trace of a signal, for example a variable density strip record of a geophone recorded as a linear function of time, is substantially uniformly illuminated with a parallel beam of monochromatic light (preferably coherent light from a laser source or the like). A spherical convex lens of focal length $f_1$ is placed on a perpendicular to the plane of the trace in front of the trace at a distance $f_1$. This lens transforms the light projected from the illuminated trace to form the Fourier energy spectrum or diffraction pattern of the illuminated signal in a plane parallel to the plane of the trace and distant $2f_1$ from the trace. This has already been taught. See for example "Optical Processing of Bubble Chamber Photographs" by D. G. Falconer, Applied Optics, vol. 5, No. 9 (September 1966), or the Cutrona et al. reference in the IRE Transactions, already cited. In this first transform plane the various frequency components in the original signal are represented by spots of light spaced along an axis parallel to the trace, each point representing a corresponding frequency component in the signal. The amplitude or intensity of each spot represents the amplitude or energy in the original signal corresponding to each frequency component of that signal. If a second lens of focal length $f_2$ is placed on the same perpendicular to the plane of the trace (the optical axis) in front of the trace at a distance $2f_1+f_2$, it will transform the first diffraction pattern and present at a plane distant from the trace of $2f_1+2f_2$ a re-created image of the trace. By masking off some of the light spots in the diffraction plane, the light of the frequencies corresponding to these spots will not pass to the second lens and, therefore, will be absent from the re-created image of the trace. In this way the frequency content of a multifrequency time function can be altered. If only part of the light in the spots of light in the first diffraction plane is removed, then the frequency components represented by these spots of light will be present in the reconstructed image, but their amplitudes will be reduced in accordance with the amount of light masked from the spots of light in the first diffraction plane.

Accordingly, I place at this diffraction plane or first transform plane, a movable mask including an aperture, this mask being adapted to be moved parallel to this plane in the direction of the luminous pattern, that is, along the frequency axis, the movable mask being propelled at a rate which is a function of the luminous intensity of the spots along this pattern. The light passing through the aperture in the movable mask is again transformed by the second convex lens. This second lens produces a second Fourier transform of the luminous pattern passing the mask at the first transform plane and re-creates at a distance $2f_1+2f_2$ from the trace a record strip which resembles the original illuminated record strip. However, the frequency content of this second strip has been significantly altered due to the moving mask. As a result, a record made of this second Fourier transform, for example by illuminating a photographically sensitive film at this point, contains an optically filtered replica of the original signal in which the range of amplitude of the different frequency components has been substantially reduced. Such a record is said to be a deconvolution of the original variable density record. Thus, the effects of multiple reflections and reverberations on a seismic record can be greatly minimized by decreasing the amplitude corresponding to the frequency components of these multiple reflections and reverberations. This improves the character of the resultant seismic record.

BRIEF DESCRIPTION OF THE DRAWINGS

This invention is illustrated with the attached drawings which form a part of the specification and are to be read in conjunction with it. In these drawings the same reference numeral in different figures refers to the same or a corresponding part.

FIG. 3 shows a schematic wiring diagram of apparatus capable of taking the output of a photoelectric cell and driving a motor at a speed which rises as the illumination of the photoelectric cell increases, and vice versa.

FIG. 4 shows a chart of the variation of motor speed with light intensity on the photoelectric cell.

FIG. 5 shows the Fourier spectrum of a typical signal before and after deconvolution.

FIG. 6 shows an adjustable mask for illuminating successively individual record strips of a composite record having a plurality of traces.

DESCRIPTION OF THE PREFERRED EMBODIMENTS

Figure 1:
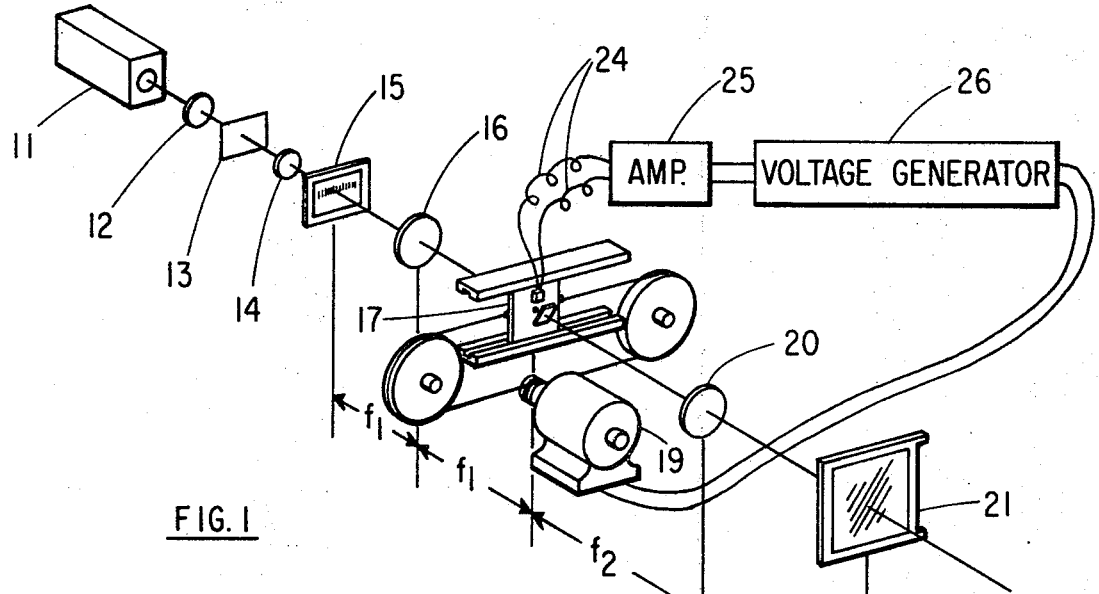
FIG. 1 shows in diagrammatic form a complete arrangement of apparatus illustrating one embodiment of my invention.

In FIG. 1 an optical processing arrangement is shown diagrammatically which is capable of carrying out my invention. A laser light source 11 produces a beam of monochromatic light, i.e., light of essentially one frequency. Actually the light is coherent, that is, substantially all of the beam is in time phase across any plane perpendicular to the beam. This light is focused by a convex lens 12 so that it passes through a "pin hole" in an otherwise opaque mask 13. A second convex lens 14 is placed at its focal length from the pin hole, thus producing a beam of essentially parallel monochromatic light which is additionally of essentially uniform intensity. The record strip or trace, which is to be illuminated, is mounted in any suitable carrier perpendicular to the illuminating beam, and of such size that it is illuminated by this beam. Thus, this strip 15 may contain a suitably reduced seismic trace or signal in variable optical density form on a transparent background so that the light passing through the trace forms a light pattern which is a replica of the trace on strip 15. This light is focused by a third convex lens 16 placed on the optic axis at a distance equal to its focal length $f_1$ from strip 15, which thereupon forms at a further distance equal to this focal length $f_1$ a Fourier spectrum parallel to the long axis of strip 15. A suitable movable mask 17 containing preferably a single aperture which is small in comparison with the maximum dimension of the diffraction pattern, is mounted in a guide 18 so that it can move parallel to the diffraction plane with the aperture in the mask successively exposing the spots of light forming the Fourier spectrum of the illuminated strip 15. As mentioned above, the speed of the motor 19 which drives mask 17 changes with the amount of light passing through the aperture in mask 17. A second convex lens 20 of focal length $f_2$ is mounted along the optic axis at a distance $f_2$ from the first diffraction plane, thus forming at a further distance $f_2$ down the optic axis an image of a strip corresponding to the original variable optical density record strip 15, but suitably filtered from a frequency standpoint so that a record made of the object at this plane (hence a Fourier transform of a diffraction pattern or a double Fourier transform of the trace), is a deconvolved equivalent to the original signal.

The means for making the permanent record of this deconvolved image is ordinarily a strip of photosensitive film 21 mounted in the usual film strip holder (not shown) in such fashion that exposure of the film occurs only due to light passing through the aperture in moving mask 17.

Figure 2:
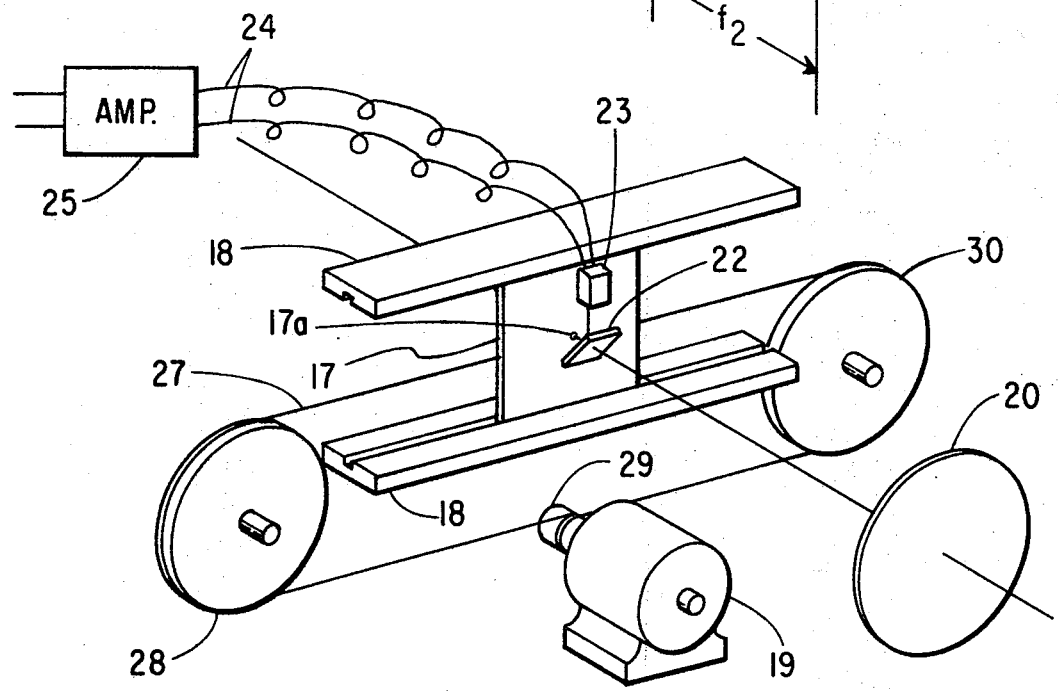
FIG. 2 shows in somewhat larger display the variable speed masking arrangement which characterizes this invention.

The apparatus for causing the movable mask to move at a speed which is directly related to the illumination passing through the aperture at that instant is shown in greater detail in FIG. 2. An optical beam-splitting device 22, which may be a prism, partly silvered mirror, or the like, is set immediately back of the aperture 17a in mask 17, permitting a major amount of the light passing through the aperture to pass symmetrically along the optic axis through convex lens 20 to the plane 21 where the permanent record is to be made. A minor part of the illumination, however, is directed upward into a small photoelectric cell (P.E.C.) 23, which is suitably energized to produce an electric signal across its terminals 24 directly proportional to illumination passing the aperture 17a in mask 17. This P.E.C. and the beam splitter 22 are preferably mounted on mask 17. The P.E.C. output is amplified by amplifier 25 which in turn is connected as input to the voltage generator 26 (more fully shown in FIG. 3). The output of this voltage generator in turn is connected to the electric motor 19.

The motor 19 is mechanically connected to move mask 17 in its guides 18 and thus to cause the aperture 17a to scan the Fourier spectrum. One method of accomplishing this is to connect (as shown in FIG. 2) one side of the mask 17 by a cord 27 over a pulley 28 and around the motor pulley 29, past pulley 30, where it again connects to the mask 17. Thus, as the motor pulley 19 revolves, the mask moves along the grooves in its guides 18 from one end of the power spectrum to the other. This Fourier spectrum is a symmetrical pattern on each side of center, so that this scanning need only take place over one-half of the pattern, the other half being masked off.

The voltage generator 26 is shown in more detail in FIG. 3. The output of the amplifier 25 appears as a voltage across the adjustable resistor 31. This is connected in series with a suitable poled rectifier 32 across an adjustable D.C. source 33 which is in series with a second suitably poled rectifier 34. The voltage resulting from this combination is applied across the electric motor 19 (which preferably is a series motor), the output speed of which is at least approximately proportional to the voltage applied across it. A further adjustable resistor 35 may be connected by a switch 36 to furnish a variable shunt across motor 19. The rectifiers 32 and 34 are poled so that the voltage applied across the electric motor 19 consists of either a basic constant voltage due to the D.C. source 33 or a variable voltage across adjustable resistor 31, whenever this variable voltage is greater than the voltage of source 33. Rectifiers 32, 34 are used to isolate the two voltage sources to prevent their reacting one on the other.

With this arrangement the voltage generator 26 applies, due to source 33, a basic adjustable voltage across motor 19 which drives the motor at a preselected adjustable minimum speed chosen to give suitable illumination of the Fourier power spectrum through movable mask 17. Increase in illumination of the photoelectric cell 23 amplified by amplifier 25 increases the voltage applied across resistor 31. When this voltage becomes larger than that of 33, the voltage of 31 is then applied to motor 19, and hence, increases its speed and that of the mask 17. Decrease of the illumination below the base levels decreases the voltage output of amplifier 25 across resistor 31. When this becomes less than the voltage of 33, the motor 19 receives current from the source 33 and runs at constant speed.

This variation of speed with light intensity is plotted in FIG. 4. The speed $N_m$ is the minimum speed corresponding to source 33. This speed is controlled by the source 33 which can be adjusted by lead 60. For light intensities below $L_m$ there is no change in speed, while for light intensities above $L_m$ the motor acts to cut the intensity transmitted through the aperture 17a, by speeding up the motor. As shown in this figure, the increase in the light intensity on the photoelectric cell greater than the value $L_m$ speeds up the rates of mask travel and vice versa. This tends to make the variation of amplitude with frequency of the Fourier power spectrum as transmitted by the aperture in mask 17 considerably more uniform than otherwise would be the case.

Consider the values of motor speed $N_a$ and light intensity $L_a$ corresponding to point 62. If we consider this value $L_a$ as the average illumination in the transform, then for higher illuminations the motor speeds up, causing a lesser transmission of light and therefore a relative lessening of the intensity transmitted through lens 20. This tends to filter out light from those frequencies which have high intensities. Conversely, when the intensity drops below $L_a$, but still above $L_m$, the motor slows down, permitting a relatively larger portion of the illumination in the spectrum to pass through lens 20. Thus the intensity of those spots whose intensity lies between $L_m$ and $L_a$ is relatively increased. For those spots of intensity less than $L_m$, the motor speed is constant and there is no relative change of intensity with frequency.

In FIG. 5 is shown in a solid line the variation of amplitude with frequency of a typical power spectrum of a signal. By use of the variable speed masking technique already described, the high peaks of the amplitude (at 40 and 41) can be suitably decreased while the intermediate amplitude components are increased.

Put another way, the exposure on the permanent record or film 21 has been considerably increased in uniformity (relating amplitude to frequency) by this variable masking technique. In a seismic record the peaks 40 and 41 correspond to undesirable signals appearing regularly across the record, and thus, corresponding to reverberations and multiple reflections. The dashed Fourier spectrum 42 shows that the effect of these multiple reflections has indeed been considerably minimized on the resultant record, thus permitting the observer to identify events which otherwise would be masked by the multiple reflections.

The amount of deconvolution desired varies with the type of record being handled. Accordingly, it is not possible in advance to specify precisely what the variation of mask speed with light intensity should be. However, having an adjustable output resistor 31 across amplifier 25 and also having a variable shunt resistor 35 which can be connected across motor 19, permits a very wide variation in the intensity-speed characteristic so that the degree of deconvolution can be varied. It is quick and simple to make one traverse of the mask with one adjustment of the voltage generator 26 and study the developed film 21. If the desired degree of deconvolution has not been obtained, one can increase the shunt resistance 25 or the size of the adjustable resistor 31 to secure greater deconvolution. Other adjustments will occur to those practicing this technique.

It is also apparent that the voltage generator shown in FIG. 3 is only one of a number of types that can be successfully employed, knowing the principles involved.

I have found it is possible to scan not only a single trace at a time but a plurality of side-by-side traces. In this case this plurality of traces in side-by-side arrangement are produced on the transparency which is mounted for illumination. The power spectrum produced at the first diffraction plane is the power spectrum of the entire record, i.e., of all the record strips taken together. The second Fourier transform, that is, the Fourier transform of this diffraction pattern, will now be deconvolved by the movable mask, thus averaging the effects of deconvolution for the traces included.

When the original record is of a plurality of traces, it is possible to scan selectively each trace by forming a second opaque mask 50 containing a slit opening 51 of the length and width corresponding to those of an individual record trace. This is mounted in a set of guides 52 so that the mask can move parallel to itself. A suitable screw 53 can be used to move this mask so that successively it exposes each of the traces for which a deconvolution is to be made. This entire apparatus is shown in FIG. 6. In use, it is mounted in a position close to strip 15 and moved down after each deconvolution has occurred, so that successive strip portions of the record are exposed successively to the coherent illumination from source 11. Each strip then in turn forms a Fourier power spectrum at the diffraction plane where mask 17 is located, and for each traverse of this mask a deconvolved trace is made with a film 21 or the like.

If desired, the photographic strip 41 may be replaced by any suitable desired alternate means of forming a permanent record of the second Fourier transform, i.e., of the deconvolved record.

It is apparent that alternatives to the portions of the preferred embodiment can be made which will operate in accordance with the principles already set forth. The invention is best described in the appended claims.

I claim:
1. Apparatus for performing deconvolution of a variable optical density record including at least one trace, comprising
   means for substantially uniformly illuminating said record with monochromatic light,
   means for producing a first Fourier transform of at least a portion of said record at a first transform plane including a first convex lens set substantially at its focal length from said record,
   means for producing a second Fourier transform of said first Fourier transform of said illuminated record including a second convex lens set substantially at its focal length from said first transform plane,
   movable mask means mounted at least close to said first transform plane and adapted to be moved parallel to said plane in the direction of said first Fourier transform, and
   means to move said mask means at a rate directly related to the illumination of said first Fourier transform.
2. Apparatus in accordance with claim 1 in which said movable mask means defines a single aperture small in comparison with the maximum dimension of the pattern of said Fourier transform, and said monochormatic light is coherent.
3. Apparatus in accordance with claim 2 in which said means for moving said mask comprise
   a photoelectric device for producing an electric signal responsive to the illumination of said aperture, and
   a motor driving said mask across said diffraction pattern at a speed directly related to said electric signal.
4. Apparatus in accordance with claim 3 including means for diverting a fixed minor proportion only of the illumination of said aperture to said photoelectric device, and
   an amplifier responsive to said electric signal for controlling the speed of said motor.
5. Apparatus in accordance with claim 4 including photographic means for making a permanent record of the second Fourier transform of said first Fourier transform as modified by the motion of said mask.
6. Apparatus in accordance with claim 1 in which said record comprises a variable density transparency illuminated on the side opposite to said first lens.
7. Apparatus in accordance with claim 1 including second mask means with an aperture adapted to be positioned close to said record and moved along said record so as to expose successive portions of said at least one trace to said illumination.
8. Apparatus in accordance with claim 2 in which said record comprises a plurality of traces in side-by-side relationship.
9. Apparatus in accordance with claim 8 including third movable mask means positioned close to said record and adapted to pass light from preselected traces of said record.
10. Optical processing apparatus comprising
    (a) a variable density record of a multifrequency function in the form of a strip,
    (b) means for substantially uniformly illuminating said strip with parallel monochromatic light, said light defining an optical axis,
    (c) means for producing a diffraction pattern of at least a portion of said function at a diffraction plane, including a first convex lens set substantially at its focal length from said strip and normal to said axis,
    (d) means for producing a Fourier transform of the luminous pattern at said diffraction plane, including a second convex lens set substantially at its focal length from said diffraction plane and normal to said axis,
    (e) movable mask means including an aperture, mounted at least close to said diffraction plane and adapted to be moved parallel to said plane in the direction of the luminous pattern at said plane,
    (f) means to move said mask means at a rate which is a function of the luminous intensity along said pattern, and
    (g) means to record said Fourier transform.
11. Optical processing apparatus comprising
    (a) a strip record of a multifrequency function expressed as contiguous narrow lines along said strip and arranged perpendicular to the length of said strip, having optical properties which are functions of the corresponding values of said function,
    (b) means for substantially uniformly illuminating said strip with monochromatic light,
    (c) a first convex lens of focal length $f_1$ placed along and perpendicular to an axis perpendicular to said strip at a distance $f_1$ from said strip,
    (d) movable mask means placed along and perpendicular to said axis approximately $2f_1$ from said strip, said mask means adapted to move in a plane substantially parallel to the direction of said strip,
    (e) a second convex lens of focal length $f_2$ placed along and perpendicular to said axis at a distance from said strip of $2f_1+f_2$,
    (f) means to move said mask means at a rate which is a function of the luminous intensity in the plane of said mask and,
    (g) radiation sensitive recording means placed along and perpendicular to said axis at a distance from said strip of $2f_1+2f_2$.

References Cited
UNITED STATES PATENTS

| | | | |
|---|---|---|---|
| 2,964,240 | 12/1960 | Brinster et al. | 250—219 X |
| 3,409,872 | 11/1968 | Hogg et al. | 340—15.5 |
| 3,424,512 | 1/1969 | Ingalls | 350—162 |
| 3,466,127 | 9/1969 | Hauer | 350—162 |

WALTER STOLWEIN, Primary Examiner

U.S. Cl. X.R.

340—15.5; 350—162; 356—71